(12) United States Patent
Hefer

(10) Patent No.: US 10,464,164 B2
(45) Date of Patent: Nov. 5, 2019

(54) RAIL WELDING CRUCIBLE AND CAP WITH AN OXYGEN/PROPANE GAS RAIL-PREHEATING BURNER IGNITED REACTION STARTER MIX

(71) Applicant: Orgo-Thermit Inc., Manchester, NJ (US)

(72) Inventor: Frederick Carel Hefer, Manchester, NJ (US)

(73) Assignee: Orgo-Thermit Inc., Manchester, NJ (US)

( * ) Notice: Subject to any disclaimer, the term of this patent is extended or adjusted under 35 U.S.C. 154(b) by 68 days.

(21) Appl. No.: 15/923,325

(22) Filed: Mar. 16, 2018

(65) Prior Publication Data

US 2019/0151984 A1    May 23, 2019

Related U.S. Application Data

(60) Provisional application No. 62/587,692, filed on Nov. 17, 2017.

(51) Int. Cl.
*B23K 1/00* (2006.01)
*B23K 23/00* (2006.01)

(52) U.S. Cl.
CPC .................... *B23K 23/00* (2013.01)

(58) Field of Classification Search
CPC ............... B23K 1/0006; B23K 20/165; B23K 2101/26; B23K 2101/28; B23K 23/00
USPC ..................... 228/234.3, 4.1, 19, 44.3, 49.1
See application file for complete search history.

(56) References Cited

U.S. PATENT DOCUMENTS

| 2,422,965 A * | 6/1947 | Ricklin | B23K 23/00 |
| | | | 126/263.01 |
| 3,189,959 A * | 6/1965 | Ahlert | B23K 23/00 |
| | | | 164/54 |
| 3,803,703 A * | 4/1974 | Montgomery | B23K 23/00 |
| | | | 228/189 |

(Continued)

FOREIGN PATENT DOCUMENTS

| CA | 2814421 A1 * | 4/2012 | ............. B23K 23/00 |
| DE | 19822851 A1 * | 11/1999 | ............. B23K 23/00 |

(Continued)

OTHER PUBLICATIONS

Machine translation of JP-2003236684A (no date available).*

*Primary Examiner* — Kiley S Stoner

(57) ABSTRACT

A rail welding crucible and cap with burner-ignited reaction starter mix has a cap, an igniter core, and a crucible. The igniter core is a mixture of material that can be ignited by an oxygen/propane gas rail-preheating burner and forms the reaction starter mix for an aluminothermic reaction. The cap is mounted over the crucible and used to hold the igniter core in a desired position. A core-receiving hole traverses through the cap, from a first face to a second face. The igniter core is mounted within the core-receiving hole so that the igniter core can flow into a reaction cavity of the crucible. The reaction cavity is a receptacle within the crucible which serves as a temporary holder for a quantity of rail-bonding material that undergoes the aluminothermic reaction. The quantity of rail-bonding material becomes molten and flow onto the joint once the aluminothermic reaction reaches a desired phase.

2 Claims, 8 Drawing Sheets

(56) References Cited

U.S. PATENT DOCUMENTS

| | | | | |
|---|---|---|---|---|
| 4,063,720 A * | 12/1977 | Boutet | B23K 23/00 | 266/167 |
| 4,149,704 A * | 4/1979 | de Savigny | B23K 23/00 | 266/167 |
| 4,247,074 A * | 1/1981 | Stratmann | B23K 23/00 | 249/86 |
| 4,250,944 A * | 2/1981 | Moring | E01B 11/52 | 164/108 |
| 4,507,082 A * | 3/1985 | Wardlaw, III | E21B 36/008 | 166/58 |
| 4,522,322 A * | 6/1985 | Guntermann | B23K 23/00 | 222/54 |
| 4,585,158 A * | 4/1986 | Wardlaw, III | E21B 36/008 | 228/232 |
| 4,605,053 A * | 8/1986 | Fricke | B22D 19/04 | 164/54 |
| 4,658,886 A * | 4/1987 | Carlson | B22C 1/00 | 164/364 |
| 4,879,452 A * | 11/1989 | Kovarik | B23K 23/00 | 219/130.4 |
| 4,881,677 A * | 11/1989 | Amos | B23K 23/00 | 228/33 |
| 4,885,452 A * | 12/1989 | Amos | B23K 23/00 | 219/130.4 |
| 4,889,324 A * | 12/1989 | Brosnan | B23K 23/00 | 266/157 |
| 5,135,124 A * | 8/1992 | Wobser | B65D 41/0471 | 215/222 |
| 5,145,106 A * | 9/1992 | Moore | B23K 23/00 | 228/234.3 |
| 5,151,202 A * | 9/1992 | Bommart | B23K 23/00 | 164/54 |
| 5,171,378 A * | 12/1992 | Kovarik | B23K 23/00 | 148/23 |
| 5,215,139 A * | 6/1993 | Swartz | B23K 23/00 | 164/138 |
| 5,279,455 A * | 1/1994 | Fuchs | B23K 23/00 | 228/234.3 |
| 5,419,484 A * | 5/1995 | Radulescu | B23K 23/00 | 228/234.3 |
| 5,490,888 A * | 2/1996 | Assel | B23K 23/00 | 149/108.2 |
| 5,529,202 A * | 6/1996 | Shamis | A47G 19/2272 | 220/301 |
| 5,582,228 A * | 12/1996 | Stidham | B23K 23/00 | 164/54 |
| 5,647,425 A * | 7/1997 | Foutz | B23K 23/00 | 164/54 |
| 5,653,279 A * | 8/1997 | Foutz | B23K 23/00 | 164/54 |
| 5,829,510 A * | 11/1998 | Fuchs | B23K 23/00 | 164/54 |
| 5,954,261 A * | 9/1999 | Gaman | B23K 23/00 | 228/33 |
| 6,382,496 B1 * | 5/2002 | Harger | B23K 23/00 | 228/234.3 |
| 6,776,386 B1 * | 8/2004 | Morrissey | B23K 23/00 | 164/54 |
| 7,946,466 B1 * | 5/2011 | Lofton | B23K 23/00 | 228/18 |
| 9,010,402 B2 * | 4/2015 | Gross | B22D 19/04 | 164/54 |
| 10,350,703 B2 * | 7/2019 | Abedraboh | B23K 23/00 | |
| 2002/0104953 A1 * | 8/2002 | Triantopoulos | B23K 23/00 | 249/86 |
| 2003/0006272 A1 * | 1/2003 | Cordier | B23K 23/00 | 228/234.3 |
| 2003/0006538 A1 * | 1/2003 | Mohler | B23K 7/00 | 266/74 |
| 2003/0116693 A1 * | 6/2003 | Hantusch | B23K 23/00 | 249/86 |
| 2003/0178168 A1 * | 9/2003 | Triantopoulos | B23K 23/00 | 164/54 |
| 2004/0003907 A1 * | 1/2004 | Moore | B23K 23/00 | 164/54 |
| 2004/0048058 A1 * | 3/2004 | Moore | B23K 23/00 | 428/328 |
| 2004/0149333 A1 * | 8/2004 | Johansen | F16K 24/044 | 137/202 |
| 2004/0222274 A1 * | 11/2004 | Harger | B23K 23/00 | 228/234.3 |
| 2005/0252949 A1 * | 11/2005 | Plotz | B22D 19/04 | 228/196 |
| 2006/0054626 A1 * | 3/2006 | Delcroix | B23K 23/00 | 220/371 |
| 2006/0273060 A1 * | 12/2006 | Fricke | B65D 41/0471 | 215/222 |
| 2007/0017955 A1 * | 1/2007 | Siracki | B23K 23/00 | 228/2.5 |
| 2007/0107869 A1 * | 5/2007 | Lofton | B23K 23/00 | 164/54 |
| 2007/0272114 A1 * | 11/2007 | Delcroix | B22C 9/02 | 104/2 |
| 2008/0061039 A1 * | 3/2008 | Danks | B23K 25/00 | 219/73.1 |
| 2008/0217042 A1 * | 9/2008 | Judson | B60M 5/00 | 174/19 |
| 2009/0173873 A1 * | 7/2009 | Stidham | B23K 23/00 | 249/83 |
| 2010/0163607 A1 * | 7/2010 | Viseur | B23K 23/00 | 228/234.3 |
| 2011/0132967 A1 * | 6/2011 | Lofton | B22D 19/04 | 228/33 |
| 2011/0240244 A1 * | 10/2011 | Sepelak | B22D 19/04 | 164/54 |
| 2012/0015212 A1 * | 1/2012 | Karimine | B23K 11/04 | 428/681 |
| 2012/0255699 A1 * | 10/2012 | Sepelak | B22C 9/06 | 164/54 |
| 2014/0045134 A1 * | 2/2014 | Hantusch | B23K 23/00 | 432/227 |
| 2014/0182803 A1 * | 7/2014 | Thuru | B23K 23/00 | 164/54 |
| 2015/0328716 A1 * | 11/2015 | Duart Lvarez Cienfuegos | B23K 23/00 | 164/54 |
| 2016/0311063 A1 * | 10/2016 | Hoagland | B23K 37/06 | |
| 2017/0028504 A1 * | 2/2017 | Workman | B23K 23/00 | |
| 2017/0348795 A1 * | 12/2017 | Abedraboh | B23K 20/165 | |
| 2019/0001431 A1 * | 1/2019 | Stilwell | B23K 20/165 | |
| 2019/0009980 A1 * | 1/2019 | McDuffe | B65D 88/76 | |
| 2019/0054557 A1 * | 2/2019 | Ruland | B22D 33/00 | |
| 2019/0101288 A1 * | 4/2019 | Hoagland | F23Q 1/02 | |
| 2019/0127925 A1 * | 5/2019 | Bordery | B23K 23/00 | |
| 2019/0143446 A1 * | 5/2019 | Yu | B23K 23/00 | |

FOREIGN PATENT DOCUMENTS

| | | | | |
|---|---|---|---|---|
| EP | 0407240 A1 * | 1/1991 | | B23K 23/00 |
| EP | 0802014 A2 * | 10/1997 | | B23K 23/00 |
| FR | 2893871 B1 * | 10/2008 | | B23K 23/00 |
| JP | 2003236684 A * | 8/2003 | | |
| JP | 2005052425 A * | 3/2005 | | |
| WO | WO-2008113653 A1 * | 9/2008 | | B23K 23/00 |

* cited by examiner

RAIL WELDING CRUCIBLE AND CAP WITH AN OXYGEN/PROPANE GAS RAIL-PREHEATING BURNER IGNITED REACTION STARTER MIX

The current application claims a priority to the U.S. Provisional Patent application Ser. No. 62/587,692 filed on Nov. 17, 2017.

FIELD OF THE INVENTION

The present invention relates generally to thermite rail welding. More particularly, the present invention relates to a system for welding two or more railroad rails that uses a reaction starter mix, which can be ignited without the use of explosive or electronically controlled ignition system.

BACKGROUND OF THE INVENTION

Thermite welding is the welding process that incorporates the use of molten metal for the permanent connection between conductors. Thermite welding is heavily used to weld railway rails. The typical process of welding railway rails together involves the use of a crucible. Thermite with alloying metal is placed within the crucible. The rails are preheated using a standard oxygen/propane preheating burner and the thermite composition is ignited with a traditional barium nitrate igniter that allows the alumino-thermic reaction to occur. Due to the thermite welding process needing a traditional ignition system, these igniters are shipped together with the other welding consumables. Shipping traditional igniters across country borders is a security/safety issue due to government regulations and HAZMAT classifications. There is an area of need for an ignition system for thermite rail welding which does not require a traditional igniter.

It is therefore an objective of the present invention to provide an ignition system for thermite rail welding. The present invention includes a reaction starter mixture which is incorporated into the cap of a degradable crucible. Rather than using a traditional ignition system, a standard oxygen/propane preheating burner may be used to ignite the reaction starter mixture for the thermite welding process.

DETAIL DESCRIPTIONS OF THE INVENTION

Figure 1:
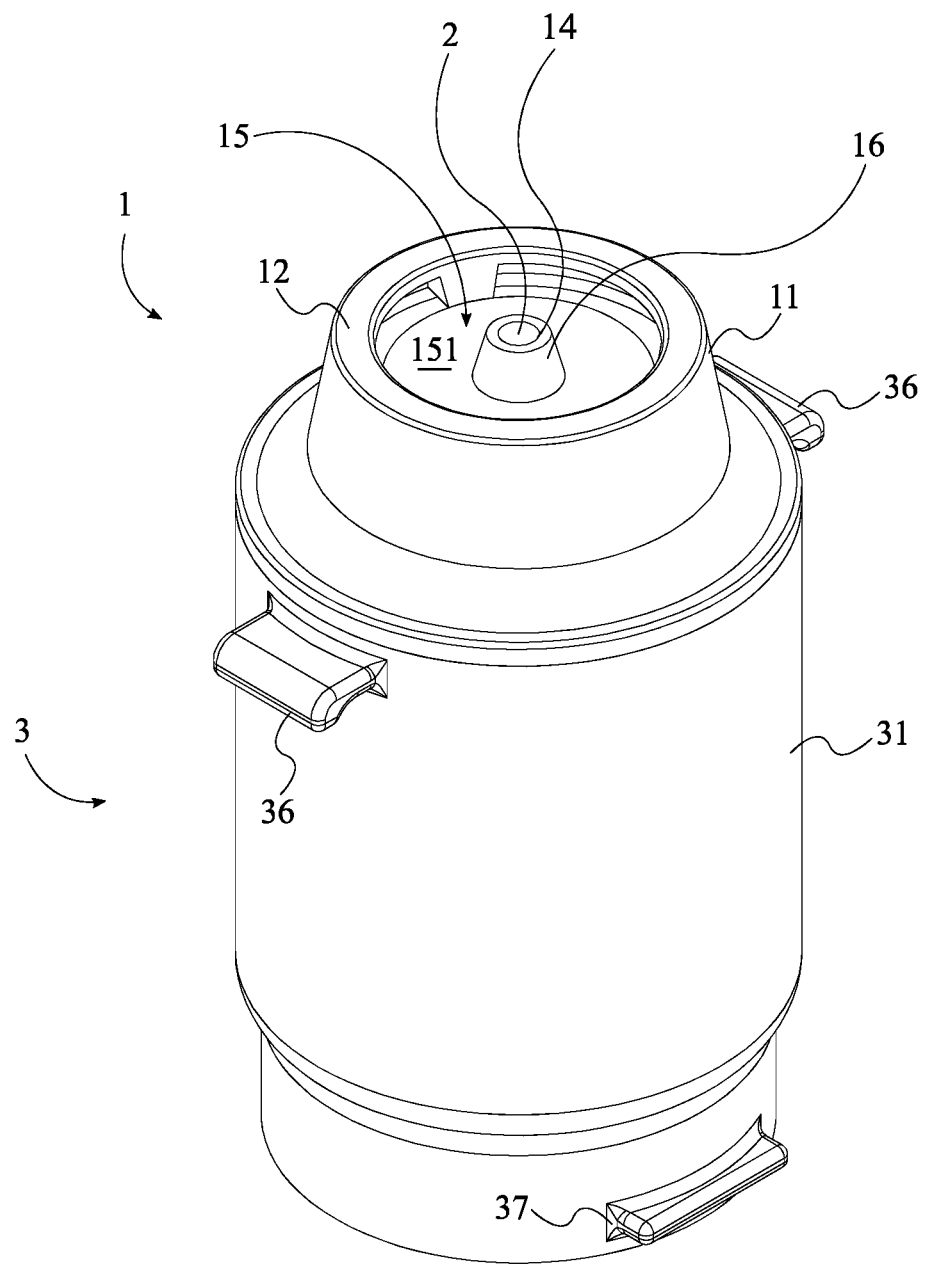
FIG. 1 is a perspective view of the present invention.
Figure 2:
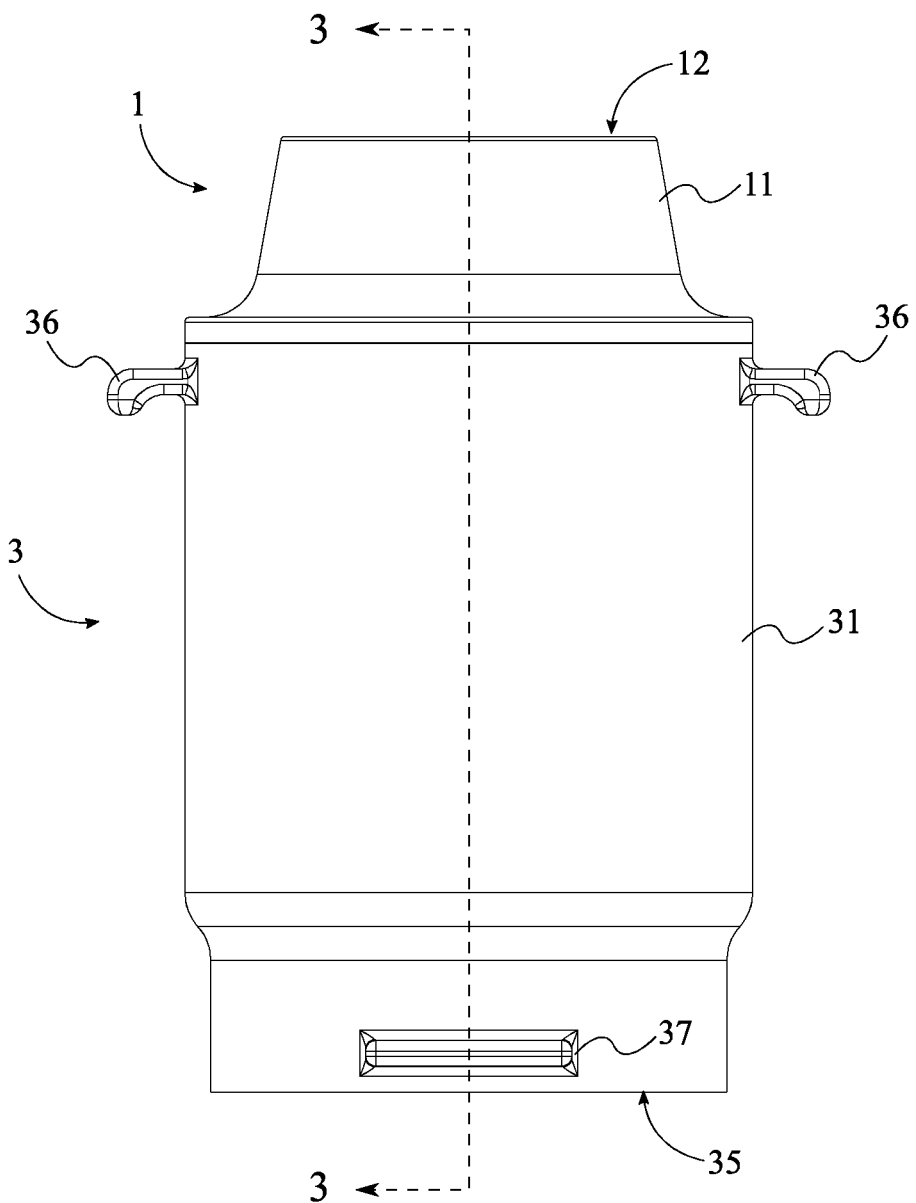
FIG. 2 is a front view of the present invention.

All illustrations of the drawings are for the purpose of describing selected versions of the present invention and are not intended to limit the scope of the present invention.

Referring to FIG. 1 through FIG. 8, the preferred embodiment of the present invention, the rail welding crucible and cap with burner-ignited reaction starter mix, is a rail welding device that makes use of a proprietary igniter core mixture as a reaction-starter mix. The present invention is designed to be used to form a joint between two or more sections of railroad rail. The proprietary igniter core mixture enables a user to initiate a thermite-based rail welding operation without the use of traditional explosive or electrically controlled igniters. Specifically, the proprietary igniter core used in the present invention is designed to be ignited by an open flame. Once ignited, the proprietary igniter core is used to initiate an aluminothermic reaction that causes a quantity of rail-bonding material, which is stored within the crucible, to become molten. The now molten rail-bonding material then flows through a tap hole in the crucible and is deposited onto the rails to form the joint. To achieve this functionality, the present invention comprises a cap 1, an igniter core 2, and a crucible 3. The cap 1 and the crucible 3 form a container that is used to deliver the quantity of rail-welding material to the joint between two or more sections of rail. To accomplish this, the cap 1 comprises a cap body 11, a first face 12, a second face 13, and a core-receiving hole 14. The cap body 11 is a rigid member that forms the structural foundation of the cap 1. Thus, defining the cap's 1 overall shape. Additionally, the crucible 3 comprises a crucible body 31 and a reaction cavity 32. Similar to the cap body 11, the crucible body 31 is a rigid member that forms the structural foundation of the crucible 3. Thus, defining the crucible's 3 overall shape. The first face 12 is positioned opposite to the second face 13 about the cap body 11. Accordingly, the first face 12 and the second face 13 define the surfaces of the cap 1 that enable the cap 1 to be attached to external components.

Referring to FIG. 1 through FIG. 8, the present invention is designed to facilitate initiating and completing the aluminothermic reaction. To accomplish this, the core-receiving hole 14 traverses from the first face 12, through the cap body 11, and to the second face 13. Additionally, the igniter core 2 is mounted within the core-receiving hole 14. Consequently, the igniter core 2 can be ignited by placing an oxygen/propane gas rail-preheating burner adjacent to the first face 12. The burner ignites the igniter core 2; causing the igniter core 2 to become molten. The reaction cavity 32 traverses into the crucible body 31 so that the crucible 3 is able to act as a degradable container in which the molten igniter core 2 and the quantity of rail-bonding material perform the aluminothermic reaction. The second face 13 is mounted across an opening 38 of the reaction cavity 32. As a result, the molten igniter core 2 is funneled through the core-receiving hole 14 and deposited into the reaction cavity 32 of the crucible 3. This arrangement of components enables the user to execute a rail-welding operation by mounting the crucible 3 over the unwelded joint, depositing the quantity of rail-bonding material into the reaction cavity 32, mounting the cap 1 over the opening 38, and igniting the igniter core 2. Once ignited, the igniter core 2 melts and falls into the reaction cavity 32. The molten igniter core 2 and the quantity of rail-bonding material undergo the aluminothermic reaction within the reaction cavity 32. Once the mixture within the reaction cavity 32 is sufficiently molten, the molten mixture is deposited onto the rails to establish the joint. This entire process is able to be carried out without the use of a traditional explosive igniter or an electrically controlled igniter. To accomplish this, the igniter core 2 is composed of a mixture comprising a quantity of iron oxide 21, a quantity of aluminum 22, and a quantity of bonding material 23. Further, the bonding material 23 is preferably sodium silicate. This mixture forms a non-friable material that can be ignited when subjected to an open flame, preferably from an oxygen/propane gas rail-preheating burner.

Referring to FIG. 3 through FIG. 6, the cap 1 of the present invention is designed to act as a mounting platform for both the igniter core 2 and the oxygen/propane gas rail-preheating burner that is used to ignite the igniter core 2. To accomplish this, the cap 1 further comprises a burner-receiving indent 15 and a core housing 16. The burner-receiving indent 15 traverses into the cap body 11 from the first face 12 to form a mounting point for the oxygen/propane gas rail-preheating burner. The core housing 16 is a hollow protrusion that retains the igniter core 2 in a position which enables the molten material of the igniter core 2 to be deposited into the reaction cavity 32. Specifically, the core housing 16 is connected adjacent to a base 151 of the burner-receiving indent 15. Additionally, the core housing 16 extends from the base 151 of the burner-receiving indent 15 to the first face 12. Further, the core-receiving hole 14 traverses through the core housing 16. Accordingly, the core-receiving housing maintains the igniter core 2 in a position that facilitates ignition by the oxygen/propane gas rail-preheating burner. For example, a rail worker may ignite the igniter core 2 by inserting the oxygen/propane gas rail-preheating burner into the burner-receiving indent 15. Because the core housing 16 extends from the base 151 of the burner-receiving indent 15, the core housing 16 maintains a portion of the igniter core 2 in a position that facilitate being ignited by the oxygen/propane gas rail-preheating burner, which is inserted into the burner-receiving indent 15.

Figure 3:
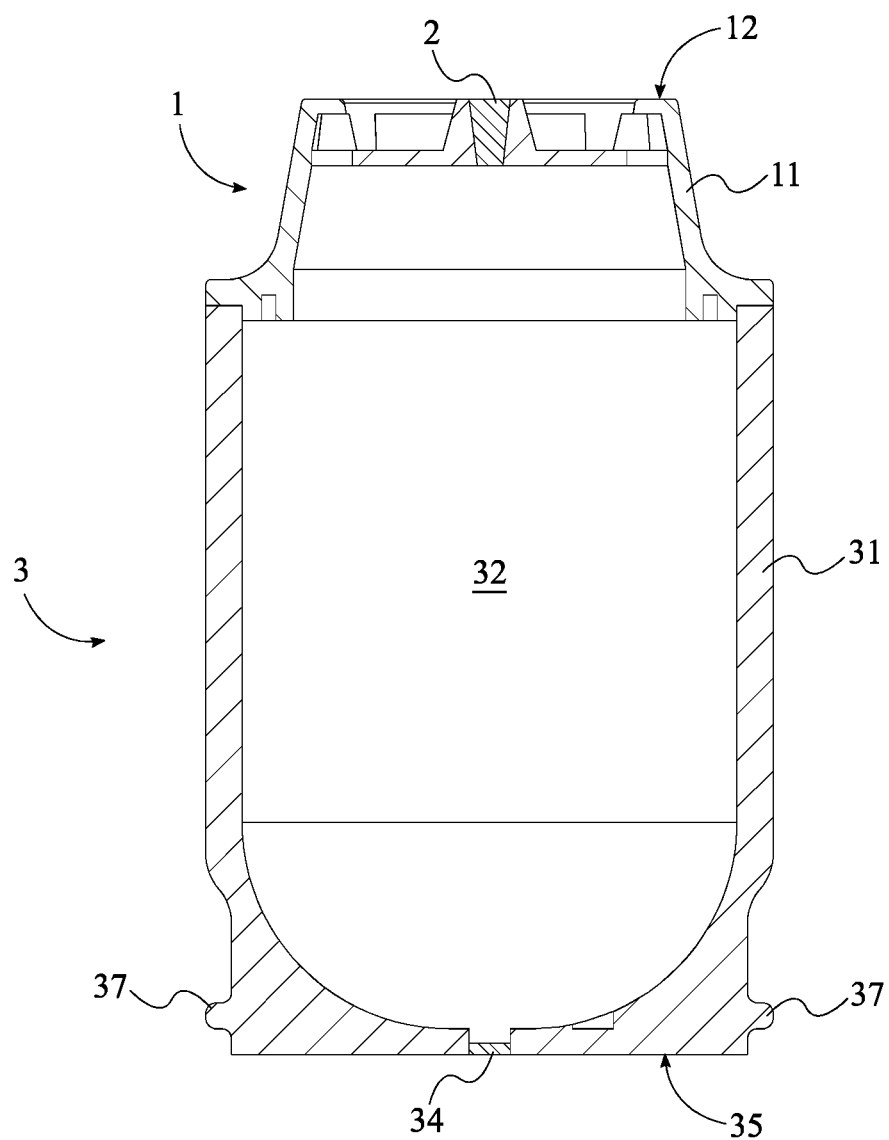
FIG. 3 is a left-side view of the present invention taken along line 3-3 in FIG. 2. In this view the igniter core and the seal are shown.
Figure 4:
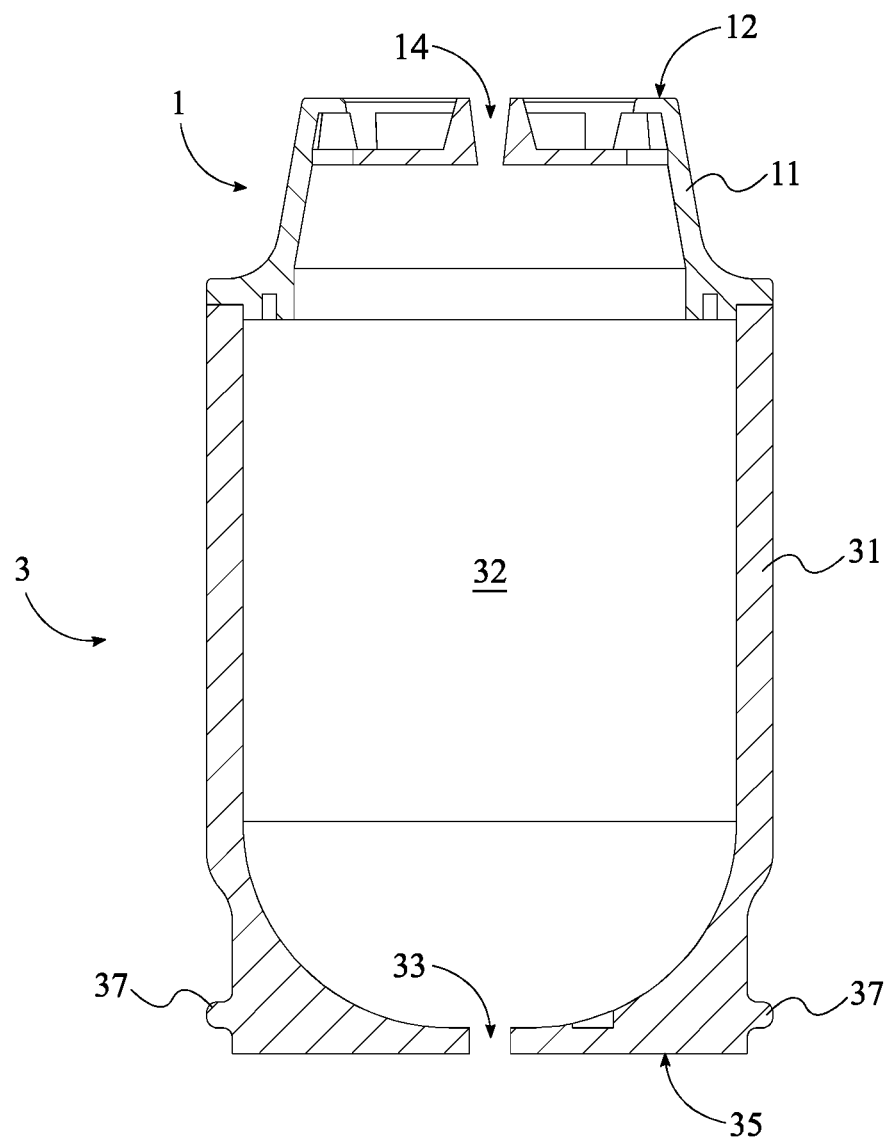
FIG. 4 is a left-side view of the present invention taken along line 3-3 in FIG. 2. In this view the igniter core and the seal are removed.
Figure 5:
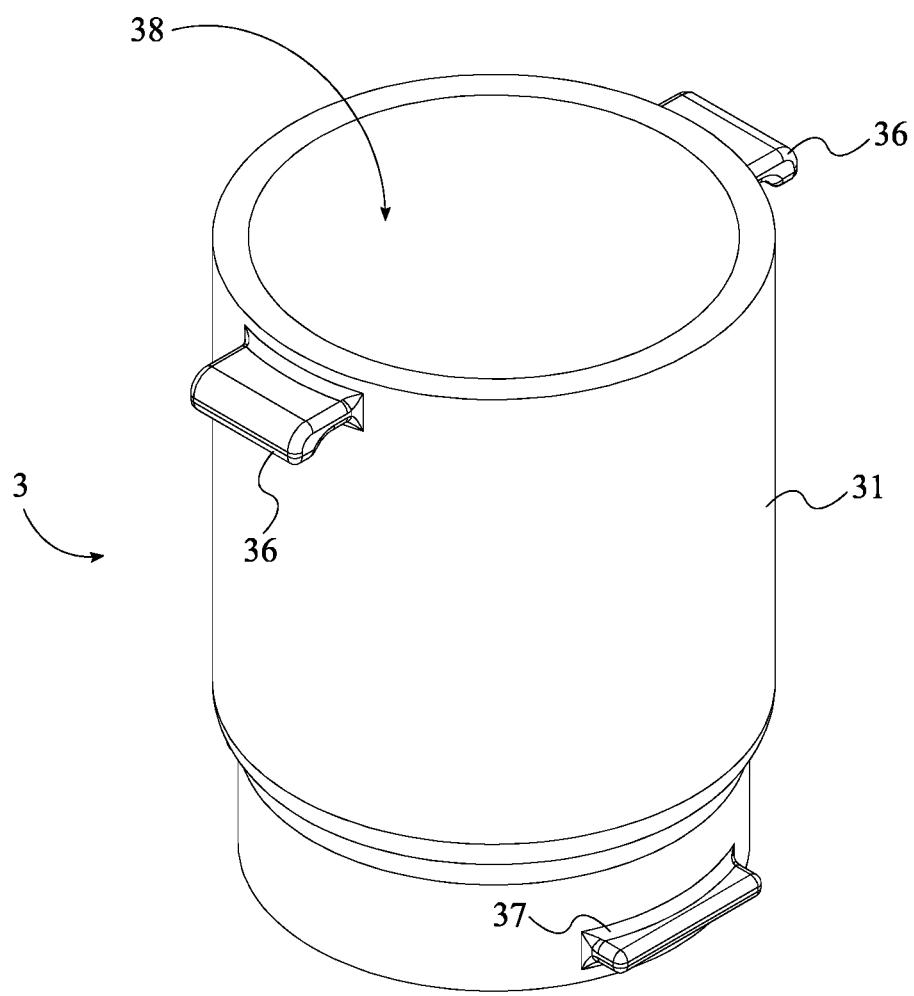
FIG. 5 is a perspective view of the crucible used in the present invention.
Figure 6:
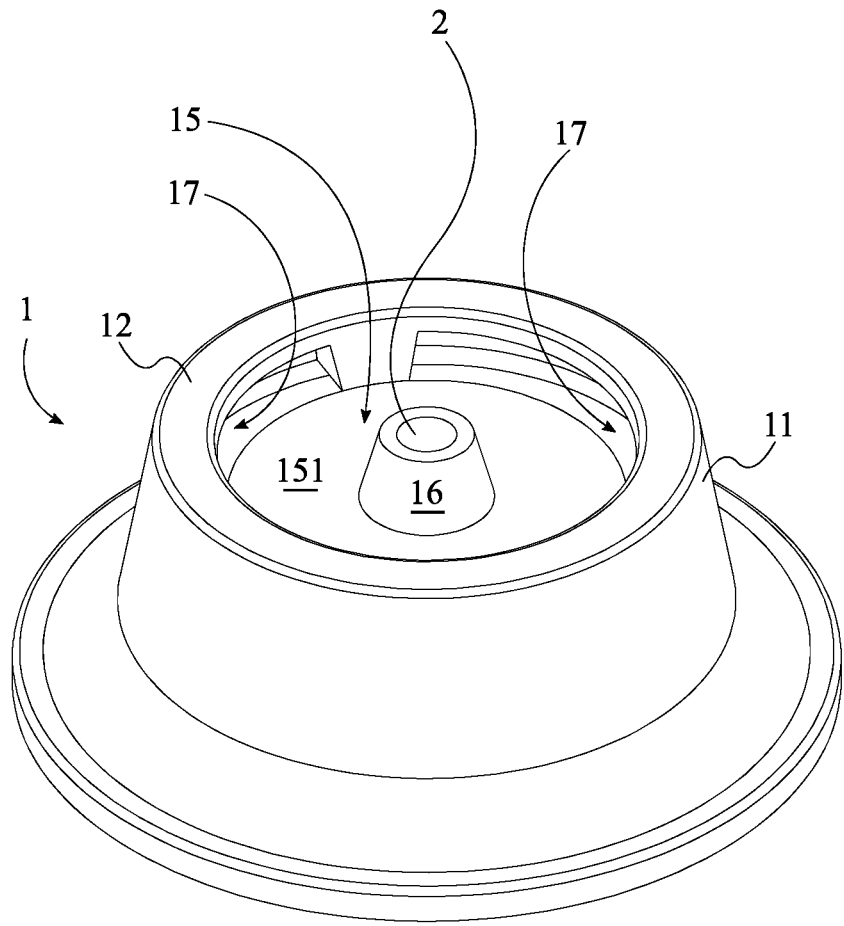
FIG. 6 is a perspective view of the cap used in the present invention.
Figure 7:
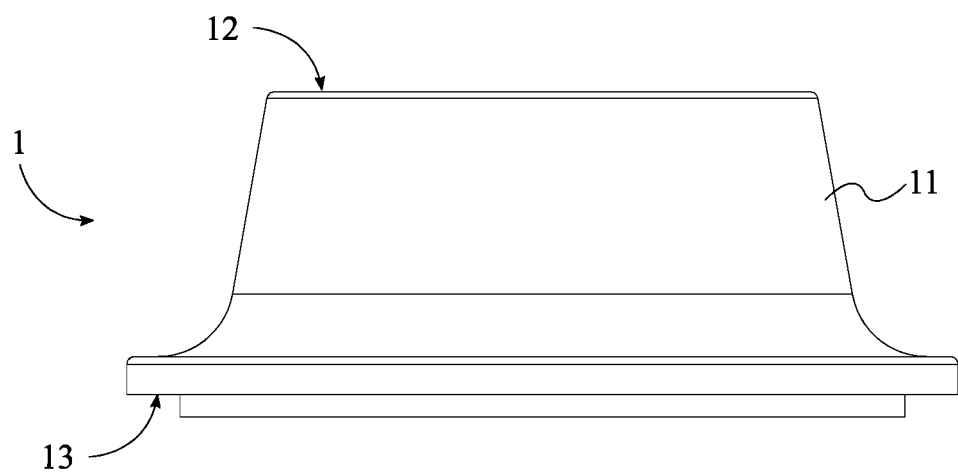
FIG. 7 is a front view of the cap used in the present invention.
Figure 8:
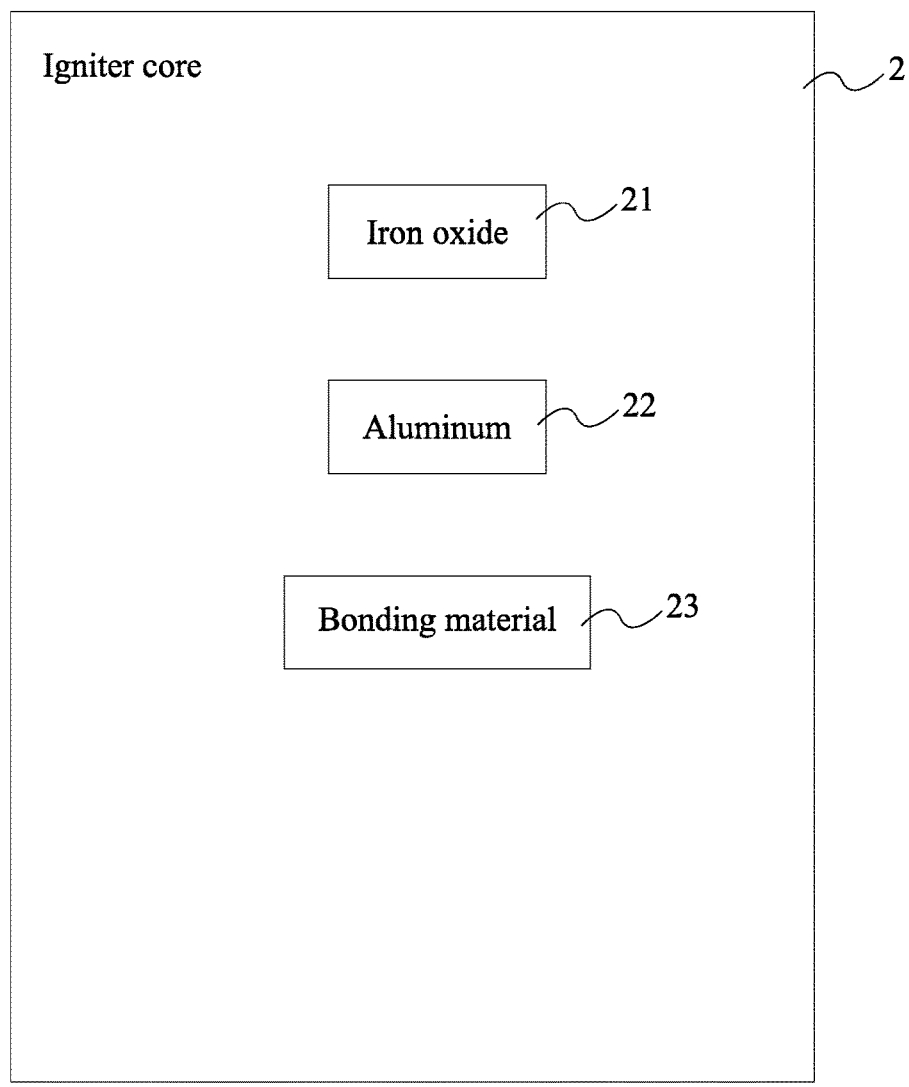
FIG. 8 is a block diagram showing the compounds of the igniter core used in the present invention.

Referring to FIG. 3, FIG. 6, and FIG. 7, the present invention is designed to enable the aluminothermic reaction to occur in a safe and controlled manner. To achieve this the cap 1 further comprises a plurality of vents 17. The plurality of vents 17 traverses from the burner-receiving indent 15, through the cap body 11, and to the second face 13. Additionally, the plurality of vents 17 is radially distributed around the core-receiving hole 14. As a result, gasses released during the aluminothermic reaction are able to be expelled through the plurality of vents 17. Thus, preventing dangerous overpressure situations. Another control-related provision of the present invention is the use of a tapered construction for the core-receiving hole 14. Specifically, the core-receiving hole 14 tapers from the first face 12 to the second face 13. Consequently, the molten igniter core 2 is prevented from flowing out of the core-receiving hole 14 as a single dollop of material. Instead, the flow of the molten igniter core 2 is governed by the size and shape of the tapered core-receiving hole 14.

Referring to FIG. 3 through FIG. 7, the crucible 3 is a container that is designed to hold the molten igniter core 2 and the quantity of rail-bonding material during the aluminothermic reaction, and then deposit the molten mixture onto the joint between two or more sections of railroad rail. To accomplish this, the crucible 3 further comprises a tap hole 33, a seal 34, a plurality of handles 36, and a plurality of mounting tabs 37.

Preferably, the seal 34 is a plug that will melt when exposed to sufficiently high temperatures. The tap hole 33 traverses from the reaction cavity 32 through a base 35 of the crucible body 31. Consequently, the tap hole 33 functions as an outlet through which the molten mixture of material is able to exit the reaction cavity 32. The tap hole 33, however, is plugged by the seal 34. The seal 34 prevents the molten mixture from flowing through the tap hole 33, until the molten mixture has reached a sufficiently high temperature. Thus, preventing the molten mixture from being deposited onto the joint before the appropriate phase of the aluminothermic reaction is reached. The plurality of handles 36 is laterally connected to the crucible body 31. Additionally, the plurality of handles 36 is radially offset from each other around the crucible body 31. Accordingly, the user is able to reposition the crucible 3 by grasping the plurality of handles 36 and lifting the entire crucible body 31. Similarly, the plurality of mounting tabs 37 is laterally connected to the crucible body 31. Additionally, the plurality of mounting tabs 37 is radially offset from each other around the crucible body 31. Further, the plurality of mounting tabs 37 is positioned adjacent to a base 35 of the crucible body 31. Thus, positioned, the plurality of mounting tabs 37 enables the crucible 3 to be maintained in a fixed position while the present invention is being used to form the joint between the railroad rails.

Although the invention has been explained in relation to its preferred embodiment, it is to be understood that many other possible modifications and variations can be made without departing from the spirit and scope of the invention as hereinafter claimed.

What is claimed is:

1. A rail welding crucible and cap with burner-ignited reaction starter mix comprising:
   a cap;
   an igniter core;
   a crucible;
   the cap comprising a cap body, a first face, a second face, a core-receiving hole, a burner-receiving indent, a core housing and a plurality of vents;
   the igniter core being a mixture;
   the mixture comprising a quantity of iron oxide, a quantity of aluminum and a quantity of bonding material;
   the crucible comprising a crucible body, a reaction cavity, a tap hole, a seal, a plurality of handles and a plurality of mounting tabs;
   the first face being oppositely positioned to the second face about the cap body;
   the core-receiving hole traversing from the first face through the cap body to the second face;
   the core-receiving hole being a conical hole by gradually tapering from the first face to the second face;
   the igniter core being mounted within the core-receiving hole;
   the reaction cavity traversing into the crucible body;
   the second face being mounted across an opening of the reaction cavity;
   the burner-receiving indent traversing into the cap body from the first face;
   the core housing being connected to an indent base of the burner-receiving indent;
   the core housing extending from the indent base to the first face;
   the core-receiving hole traversing through the core housing;
   the plurality of vents traversing from the burner-receiving indent through the cap body to the second face;
   the plurality of vents being radially distributed around the core-receiving hole;
   the tap hole traversing from the reaction cavity through a crucible base of the crucible body;
   the tap hole being plugged by the seal;
   the plurality of handles being laterally connected to the crucible body;

the plurality of handles being radially offset from each other around the crucible body;

the plurality of handles being adjacently positioned to the opening;

the plurality of mounting tabs being laterally connected to the crucible body;

the plurality of mounting tabs being radially offset from each other around the crucible body;

the plurality of mounting tabs being adjacently positioned to a crucible base of the crucible body; and a corresponding handle among the plurality of handles and a corresponding mounting tab among the plurality of mounting tabs being axially misaligned with each other.

2. The rail welding crucible and cap with burner-ignited reaction starter mix as claimed in claim 1, wherein the bonding material is sodium silicate.

* * * * *